US00RE42039E

(19) United States
(12) Reissued Patent
West et al.

(10) Patent Number: US RE42,039 E
(45) Date of Reissued Patent: Jan. 18, 2011

(54) DC TO AC INVERTER WITH SINGLE-SWITCH BIPOLAR BOOST CIRCUIT

(75) Inventors: Richard T. West, Ragged Point, CA (US); Gary Fourer, Nipomo, CA (US)

(73) Assignee: Xantrex Technology Inc., Livermore, CA (US)

(21) Appl. No.: 12/202,135

(22) Filed: Aug. 29, 2008

Related U.S. Patent Documents

Reissue of:
(64) Patent No.: 7,099,169
Issued: Aug. 29, 2006
Appl. No.: 10/248,825
Filed: Feb. 21, 2003

(51) Int. Cl.
*H02M 7/5387* (2006.01)
*G05F 1/10* (2006.01)

(52) U.S. Cl. ..... 363/132; 363/98; 323/222
(58) Field of Classification Search ..... 363/56.01, 363/56.02, 95, 97, 98, 131, 132; 323/222
See application file for complete search history.

(56) References Cited

U.S. PATENT DOCUMENTS 6,104,624 A 8/2000 Iwamoto et al.
6,154,380 A * 11/2000 Assow et al. ..... 363/61
6,166,924 A * 12/2000 Assow ..... 363/20
6,232,742 B1 5/2001 Wacknov et al.
6,320,769 B2 11/2001 Kurokami et al.
6,587,051 B2 * 7/2003 Takehara et al. ..... 340/635
6,606,259 B2 * 8/2003 Cohen ..... 363/56.01
6,678,174 B2 1/2004 Suzui et al.

* cited by examiner

*Primary Examiner*—Matthew V Nguyen
(74) *Attorney, Agent, or Firm*—Nixon Peabody LLP

(57) ABSTRACT

This invention improves the performance and lowers the cost of DC to AC inverters and the systems where these inverters are used. The performance enhancements are most valuable in renewable and distributed energy applications where high power conversion efficiencies are critical. The invention allows a variety of DC sources to provide power thru the inverter to the utility grid or directly to loads without a transformer and at very high power conversion efficiencies. The enabling technology is a novel boost converter stage that regulates the voltage for a following DC to AC converter stage and uses a single semiconductor switching device. The AC inverter output configuration is either single-phase or three-phase.

4 Claims, 1 Drawing Sheet

DC TO AC INVERTER WITH SINGLE-SWITCH BIPOLAR BOOST CIRCUIT

Figure 1:
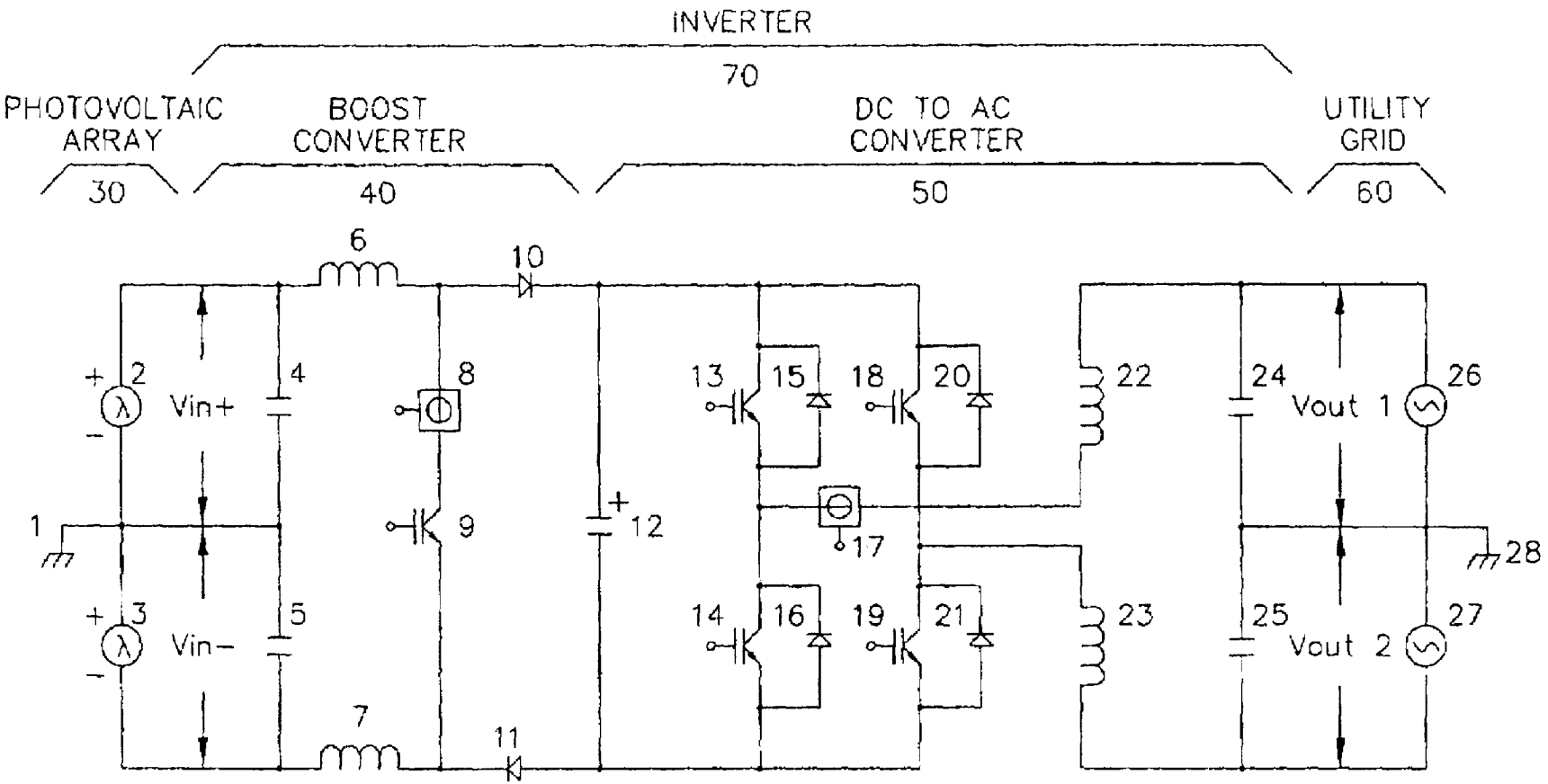

Matter enclosed in heavy brackets [ ] appears in the original patent but forms no part of this reissue specification; matter printed in italics indicates the additions made by reissue.

*This application is a Reissue application of U.S. patent application Ser. No. 10/248,825, filed on Feb. 21, 2003, which is U.S. Pat. No. 7,099,169.*

BACKGROUND OF THE INVENTION

Photovoltaic cells produce DC power over a wide voltage range depending on the amount of sunlight, ambient temperature and wind speed. A minimum DC voltage is required to directly convert this DC voltage to a standard 120 Volts AC and to do so without the use of a 60 cycle transformer. There are National Electric Code restrictions and class-of-equipment considerations that make photovoltaic arrays much more cost effective when sized for a maximum of 600 Vdc. The problem is that under some conditions, photovoltaic arrays sized for this 600 Vdc maximum will not meet the said minimum voltage requirements for direct DC to AC conversion. The prior art inverters would either use a 60 cycle transformer, a dual boost converter input stage or a full-bridge input stage with a high frequency transformer to achieve the proper voltage match over the predicted range of inverter operation. A 60 cycle transformer decreases power conversion efficiency and adds to the overall inverter or system costs. A dual boost converter input stage or a full-bridge input stage adds complexity to and lowers the conversion efficiency of the inverter.

The, prior art, dual boost converter and full directly or indirectly, is old technology and is well known. The single-switch bipolar boost converter, disclosed herein, is a novel replacement for the dual boost converter. The single-switch bipolar boost converter is less complex, lower cost and provides higher power conversion efficiencies.

DETAILED DESCRIPTION OF THE INVENTION

The invention is more related to the power circuit topology of an inverter than the control methods. The inverter topology is novel while the control methods are known.

The preferred embodiment of the invention is shown in FIG. 1 and is illustrated as part of a system consisting of three components; an inverter 70, a photovoltaic array 30 and a typical 120/240 Vac, split-phase, residential, electric utility service 60. The inverter 70 is the embodiment of the invention and is further broken down into to two functional blocks, the boost converter 40 and the DC to AC converter 50. The photovoltaic array 30 and the electric utility service 60 serve to illustrate the use and usefulness of the invention. The system described converts solar energy to electric power and functions as a distributed generator on the electric utility grid.

For maximum power conversion efficiency, it is desirable to regulate a constant voltage on capacitor 12 slightly higher than the peak voltages on the utility grid 60. Boost converter 40 performs this function. When the series voltage of photovoltaic arrays 2 and 3 is higher than the voltage on capacitor 12, current flows into capacitor 12. If a higher voltage on capacitor 12 is desired, Insulated Gate Bipolar Transistor (IGBT) 9 is closed, charging inductors 6 and 7 and back biasing diodes 10 and 11. When IGBT 9, is opened the stored energy in inductors 6 and 7 is delivered to capacitor 12. The duty cycle or on/off time ratio of IGBT 9 is proportional to the ratio of regulated voltage on capacitor 12 and the series voltage of photovoltaic arrays 2 and 3. The frequency of operation is typically upwards of 20 kHz. The circuit controlling IGBT 9 uses the voltage sensed across capacitor 12 and the current sensed with current sensor 8. The closed loop regulation method is known including algorithms for tracking the maximum power point of the photovoltaic array. For clarity, the control circuit interface is not shown. Capacitors 4 and 5 shunt high frequency currents to ground.

The DC to AC converter 50 is a known H-bridge configuration with IGBT switches 13, 14, 18, 19 and freewheeling diodes 15, 16, 20, 21. The Pulse Width Modulated (PWM) sinusoidal current regulation method for utility grid interactive inverters is known Inductor 22 and capacitor 23 form a 2-pole filter that removes high frequency PWM components, as do inductor 24 and capacitor 25. The control circuit uses current sensor 17 to regulate sinusoidal current into the utility grid, synchronized with the utility grid voltage for unity power factor power transfer. The control circuit also uses current sensor 17 to precisely regulate DC current components to near zero. These control algorithms are known.

If inductor 7 and diode 11 were replaced by short circuits, the typical, known, monopole boost circuit configuration is had. An inverter so configured could not be used with a grounded photovoltaic array unless a 60 cycle isolation transformer was used at the utility interface. This same inverter used with a floating, non-grounded photovoltaic array could be used without a transformer but undesirable, common-mode, 60 cycle and high frequency voltage components would be imposed on the array with respect to ground. With the inclusion of inductor 7 and diode 11, a single semiconductor switch can generate a bipolar voltage with respect to ground, enabling a system configuration with no transformer and with no common mode array voltage with respect to ground.

This invention facilitates high power, high frequency, lower cost DC to AC power conversion over a wide DC input range with a minimum number of semiconductor switches. This invention also facilitates an inverter that is intrinsically low in Electromagnetic Interference (EMI) production because each ungrounded input and output terminal is connected in parallel with a capacitor and in series with an inductor.

We claim:

1. An apparatus for converting DC power from solar photovoltaic modules or other DC sources into AC power where said AC power is supplied to an electric utility grid and comprising; a bipolar DC input circuit with a center-tapped connection to ground or to the zero-voltage reference point of said electric utility grid, a DC to DC converter capable of boosting said bipolar DC input circuit voltages to higher bipolar DC output voltages with respect to ground or to the zero-voltage reference point of said electric utility grid and where said DC to DC converter uses a single semiconductor switch and a DC to AC converter which converts the output of said DC to DC converter into current regulated sine waves, synchronized with said electric utility grid voltage, in order to source power into said electric utility grid and where said DC to DC converter is further defined as comprising three input terminals designated plus, common and minus where there is a capacitor connected across the plus and common terminals and a capacitor connected across the common and minus terminals and where there is a top inductor connected between the plus input terminal and the collector or drain of a semiconductor switching device and also connected to the anode of a top diode and where there is a bottom inductor connected between the minus input terminal and the emitter or source of a semiconductor switching device and also connected to the cathode of a bottom diode and where the output of said DC to DC converter has at least two terminals designated positive and negative where there is a capacitive storage element between said positive and negative output terminals and where the cathode of said top diode is connected to the positive output terminal and where the anode of said bottom diode is connected to the negative output terminal.

*2. A DC-to-DC converter comprising:*

*three input terminals designated plus, common and minus,*

*at least two terminals designated positive and negative,*

*a capacitor connected across the plus and common terminals,*

*a capacitor connected across the common and minus terminals,*

*a semiconductor switching device,*

*a top diode having a cathode connected to said positive output terminal,*

*a bottom diode having an anode connected to said negative output terminal,*

*a top inductor connected between said plus input terminal and the collector or drain of said semiconductor switching device and also connected to the anode of a top diode,*

*a bottom inductor connected between said minus input terminal and the emitter or source of said semiconductor switching device and also connected to the cathode of a bottom diode, and*

*a capacitive storage element between said positive and negative output terminals.*

*3. An inverter for coupling a photovoltaic array to a utility grid, the inverter comprising:*

*a DC-to-AC converter coupled to the utility grid; and*

*a DC-to-DC converter coupled between the photovoltaic array and the DC-to-AC converter, the DC-to-DC converter including:*

*three input terminals designated plus, common and minus,*

*at least two terminals designated positive and negative,*

*a capacitor connected across the plus and common terminals,*

*a capacitor connected across the common and minus terminals,*

*a semiconductor switching device,*

*a top diode having a cathode connected to said positive output terminal,*

*a bottom diode having an anode connected to said negative output terminal,*

*a top inductor connected between said plus input terminal and the collector or drain of said semiconductor switching device and also connected to the anode of a top diode,*

*a bottom inductor connected between said minus input terminal and the emitter or source of said semiconductor switching device and also connected to the cathode of a bottom diode, and*

*a capacitive storage element between said positive and negative output terminals.*

*4. The inverter of claim 3, further comprising a current sensor disposed between said top inductor and said switching device.*

* * * * *